A. MELLOR.
Bridle-Bits.
No. 157,340.                      Patented Dec. 1, 1874.
Fig. 1.
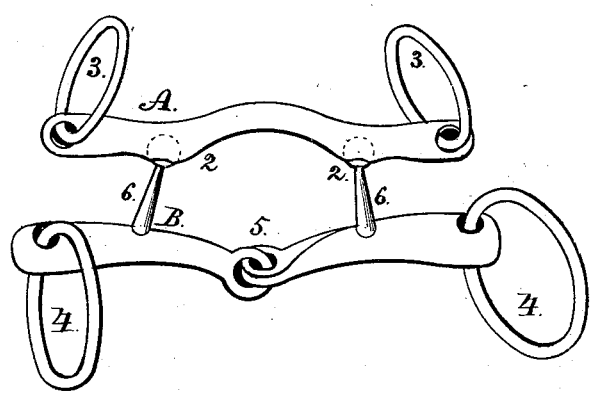
Fig. 2.
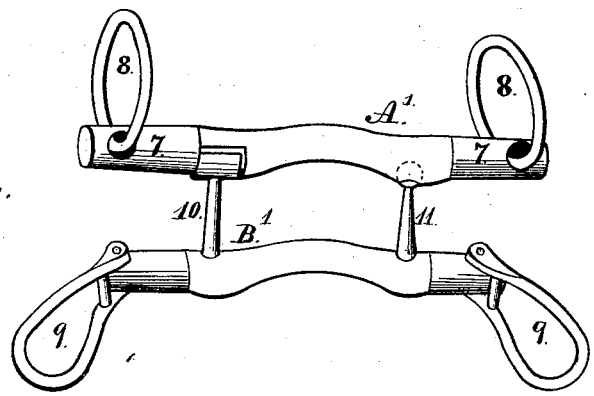
Fig. 3.     Fig. 4.     Fig. 5.
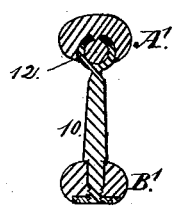 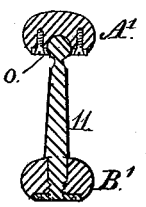 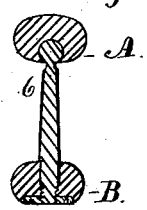
Fig. 6.
Witnesses:                      Inventor:
Benj. Morison.                Austin Mellor.
Wm H. Morison.

UNITED STATES PATENT OFFICE.

AUSTIN MELLOR, OF PHILADELPHIA, PENNSYLVANIA.

IMPROVEMENT IN BRIDLE-BITS.

Specification forming part of Letters Patent No. 157,340, dated December 1, 1874; application filed October 27, 1874.

*To all whom it may concern:*

Be it known that I, AUSTIN MELLOR, a resident of the city of Philadelphia, in the State of Pennsylvania, have invented an Improvement in Bridle-Bits, of which the following is a specification:

The object of my invention is to afford a bridle-bit whereby a more perfect and reliable control of a fractious, frightened, or runaway horse may be within the power of the rider or driver, and without producing any injury to the horse's mouth.

The construction and operation of my said invention will hereinafter be fully and clearly described with reference to the accompanying drawing, in which—

Figure 1 is a perspective view of my said improved bit, when made entirely of metal; Fig. 2, a like view of the same, when made partly of wood. Figs. 3 and 4 are respective sections of two equivalent modes of connecting the two mouth-bars of Fig. 2. Fig. 5 is a section of the best mode of connecting together the two mouth-bars of Fig. 1; and Fig. 6 is an enlarged or full-size section, showing the bow or "porch" in plan view.

The upper mouth-bar A, Fig. 1, is rigid, while the lower bar, B, is jointed at its midlength, and both bars made of solid metal—the upper one, A, about five inches and three-quarters long, and about three-eighths of an inch in diameter at its thickest parts, for a horse of the ordinary size. The middle third of its length, from 2 to 2, is bowed sufficiently to allow room for the tongue of the animal beneath it when the bit is suspended in the mouth by the ordinary cheek-straps (not shown) attached to the respective end rings 3 3. The lower bar, B, is about half an inch longer than the bar A to compensate sufficiently for the shortening of the distance between its two outer rings, 4 4, when the reins (not shown) are drawn, and consequently the joint 5 thrown forward. The motions required in the lower bar, B, require that each of its two half-lengths be connected to the upper bar, A, by a ball-and-socket or swiveling joint, on the upper connection of each of the tie-bars 6 6. The construction of said jointed connection is fully and clearly shown in Fig. 5, the ball being formed on the upper end of the bar 6, and a circular cavity in the under side of A, which, after the ball on 6 is inserted, is forged or closed sufficiently to prevent the ball from being drawn out. The opposite ends of the tie-bars 6 are screwed or otherwise firmly fixed in the respective halves of the lower or jointed bar B, as shown in Figs. 1 and 5. Referring to Fig. 2, the upper bar, A', and the bottom bar, B', are both rigid or without a joint, and made principally of hard wood, but with metallic caps 7 7 over their respective outer ends, for the purpose of better or more securely attaching the cheek-rings 8 8 and rein-rings 9 9. The middle third of the length of each of said mouth-bars A' B' is bowed and somewhat flattened, to give room for the tongue of the horse beneath them, as represented in said figure. The two bars A' B' are secured together parallel with each other and at about one inch and a quarter apart—the bottom one, B', being about half an inch shorter than the upper one, A'—by means of the two tie-bars, 10 and 11, the upper end of each being attached to the under side of the upper mouth-bar A' by a swing-joint, the one, 10, clasping a cylindrical portion, 12, in a concavity of the wood of A', (see Fig. 3,) the other, 11, being attached to said mouth-bar A' by means of a ball-and-socket joint. The socket or cavity for the ball, being in the wood of the bar A', has a metallic covering-plate, o, screwed fast to the wood, so as to keep the ball from being drawn out. The lower ends of the tie-bars 10 and 11 are screwed or otherwise rigidly fixed into the lower wooden bar B'. (See Figs. 2, 3, and 4.) The distance of the mouth-bars A B, and, also, of A' B', from each other is, in all cases, such as will bring the lower bar B or B' across that part of the lower jaw of the horse in which there never are any teeth, (excepting the tusk,) when the said bit is applied and secured by the ordinary cheek-straps, (not shown,) so as to keep the upper bar A or A' up against the two upper corners or junctions of the lips of the animal.

One of the peculiarities of my invention consists in the fact that the tie-bars will be entirely within the mouth of the animal; whereas, heretofore, what are called the "branches"

in the double-bar bits are fixed to the outer ends of the two bars, and consequently permit the horse to loll his tongue through the sides of his mouth—an objectionable practice, which the inside of the tie-bars in my bit entirely prevent, while the bowed portions or porches in the mouth-bars allow the requisite free longitudinal motions of the tongue, and do not cause any uneasiness in the mouth of the animal; and, besides, it is the only proper mode of connecting the jointed bar to a rigid one.

The bit shown in Fig. 1 is intended to be used as a driving-bit, and the bit shown in Fig. 2, being lighter and without a joint in the lower bar, (as shown in Fig. 2,) is more especially intended to be used as a riding-bit. The bit in either form is to be attached by the rings in the upper bar, A or A', to the respective cheek-straps of the bridle, (not shown,) and the lengths of said cheek-straps at the same time adjusted to keep the said upper mouth-bar up in close contact with the upper angles or junctures of the lips of the horse, and thus bringing the lower bar (B or B') across that part of the animal's lower jaw at which there never are any teeth except the pointed single tusk on each side, which are not available to grasp the said lower bar. In either case both of the mouth-bars pass across over the upper side of the animal's tongue. The usual check-rein (not shown) is also intended to be attached to the said cheek-rings 3 3 of the driving-bit. The driving-rein (not shown) is to be attached to the rings 4 4, and the bar B, having the joint 5 at its midlength, enables the driver to clamp the lower jaw of the animal at that part where there are not any teeth, except the tusk, and with but little exertion of strength hold or restrain a fractious or run-away horse without any danger of seriously injuring the animal's mouth or lips; and it will be impossible for the animal to get the said lower bar B or B' between the teeth of his upper and lower jaws, whether either of the two forms, Fig. 1 or Fig. 2, be used in the respective cases for which they are adapted.

Having thus fully and clearly described my improvement in bits for horses, and the modifications of the same whereby either a driving or a riding bit is produced, I claim as my invention—

1. A bridle-bit having two mouth-bars, A and B, connected together by tie-bars in such a manner as to cause the said tie-bars to be entirely within the horse's mouth when the said bit is in use, substantially as set forth.

2. A bit, having the lower mouth-bar attached to the upper mouth-bar by means of tie-bars, the upper ends of which swing or move freely in the under side of said upper mouth-bar, substantially as described.

3. In a driving-bit provided with two mouth-bars, connected together as described and shown, the joint 5 in the lower mouth-bar B, substantially as described.

4. The mouth-bars, bowed or curved at their middle portion, in combination with their respective tie-bars, substantially as and for the purposes set forth and described.

AUSTIN MELLOR.

Witnesses:
BENJ. MORISON,
WM. H. MORISON.